United States Patent
Cadle et al.

[11] Patent Number: 6,086,258
[45] Date of Patent: Jul. 11, 2000

[54] PRECISELY REPOSITIONABLE BEARING CAP

[75] Inventors: Terry M. Cadle, Wauwatosa; Lawrence E. Eckstein, Beaver Dam, both of Wis.

[73] Assignee: Zenith Sintered Products, Inc., Germantown, Wis.

[21] Appl. No.: 09/155,781

[22] PCT Filed: Mar. 12, 1997

[86] PCT No.: PCT/US97/04050

§ 371 Date: Oct. 2, 1998

§ 102(e) Date: Oct. 2, 1998

[87] PCT Pub. No.: WO97/42424

PCT Pub. Date: Nov. 13, 1997

Related U.S. Application Data

[60] Provisional application No. 60/016,852, May 3, 1996.

[51] Int. Cl.[7] .................................................... F16C 17/02
[52] U.S. Cl. ................................ 384/294; 384/273
[58] Field of Search .................................... 384/294, 273, 384/288, 502, 503, 432

[56] References Cited

U.S. PATENT DOCUMENTS

| 2,560,413 | 7/1951 | Carlson . | |
| 5,501,529 | 3/1996 | Cadle et al. | 384/432 |
| 5,536,089 | 7/1996 | Weber et al. | 384/294 |

FOREIGN PATENT DOCUMENTS

| 39 04 020 | 8/1990 | Germany . |
| 381 015 | 10/1964 | Switzerland . |

*Primary Examiner*—Lenard A. Footland
*Attorney, Agent, or Firm*—Quarles & Brady LLP

[57] ABSTRACT

In a bearing cap of the type which is bolted to a bearing support structure so as to define a bearing bore between the cap and the structure and in which bolt holes for securing the cap to the structure extend through feet of the cap and into the structure, the cap having at least two of the feet, one foot on each side of the bore with at least one bolt hole extending through each foot, the improvement wherein:

the cap is sintered powder metal and has an integral boss protruding from the foot around the bolt hole.

12 Claims, 6 Drawing Sheets

PRECISELY REPOSITIONABLE BEARING CAP

This application claims benefit of Provisional Application 60/016,852 filed May 3, 1996.

BACKGROUND OF THE INVENTION

1. Field of the Invention

This invention relates to bearing blocks of the type in which a bearing supporting bore is formed with half of the bore in a support structure and the other half in a bearing cap which is secured to the support structure, in which the cap must be precisely refitted to the support structure after machining operations on the bore are carried out. In particular, this invention relates to a sintered powder metal bearing cap having bosses for providing precise relocation of the cap relative to the support structure.

2. Discussion of the Prior Art

The essential function of a bearing cap is to retain and locate a rotary shaft, or a bearing for a rotary shaft which in turn retains and locates the shaft, relative to a support structure. For example, the main bearing cap of an engine bolts to a bulkhead of the engine crankcase and together with the bulkhead retains and locates the crankshaft journal in place while the crankshaft is rotating. The crankshaft journal runs against two half shell bearings which are fitted to the main bearing cap and the engine bulkhead semi-circular bores, respectively.

In this case, for vibration free, low friction and quiet running, the roundness of the bore produced by the main bearing cap and the bulkhead is very important. This roundness is achieved by a machining operation called line boring. The main bearing caps are bolted to the bulkheads of the engine block, and then a boring bar fitted with a cutting tool is used to machine the bores in the assembly. This ensures the two half rounds formed by the main bearing cap and the bearing block form as near to a perfect circle as possible. A finishing operation involving a grinding hone is often used to achieve the extremely fine tolerances needed for quiet running and efficient engine performance.

However, to install the crankshaft, it is necessary to remove the main bearing caps from the engine block. After the crankshaft is put in place, it is necessary to reposition the main bearing caps to the bulkhead so that they are replaced in the identical position they occupied during the line boring operation. Any deviation from that original position produces an out-of-round condition that, in turn, leads to vibration, noise and possibly stiff, high friction crankshaft operation.

Figure 1:
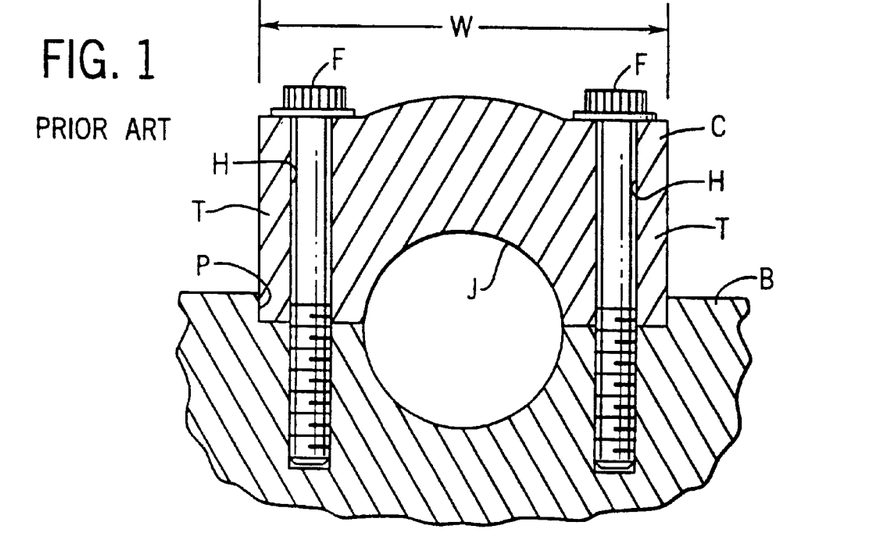
FIG. 1 is a cross-sectional view of a prior art main bearing cap secured to an engine bulkhead.

There are a number of conventional structures for re-locating and attaching the main bearing caps to bulkheads when installing the crankshaft. One such structure is shown in FIG. 1. In this instance, the main bearing cap C has a very precisely machined, snap-width W, which is the distance across the long axis of the main bearing cap across the foot sections T of the bearing cap. Similarly, a precision channel P is machined in the engine block bulkhead B to produce a controlled interference fit with the feet T when the main bearing cap C is refitted after crankshaft installation.

This method does not, however, provide relocation in the fore and aft direction (i.e., in the direction of the axis of the journal bore J). The bolt holes H themselves are used to control the axial repositioning, and since there is a substantial clearance between the bolts F and the bolt holes H of the main bearing cap C, this relocation accuracy is generally poor.

In addition, the interference fit between the main bearing caps C and the channel P in the engine block B in this structure is a variable which affects the final roundness of the bore J after re-installation. A highly stressed main bearing cap C may stress relieve during engine operation, thereby changing the roundness of the bore. Also, the precision machining operations required on the main bearing caps C to define the snap width W and on the block B to form the channel P, so as to avoid an overstressed or loose main bearing cap in this structure, are relatively expensive.

Figure 2:
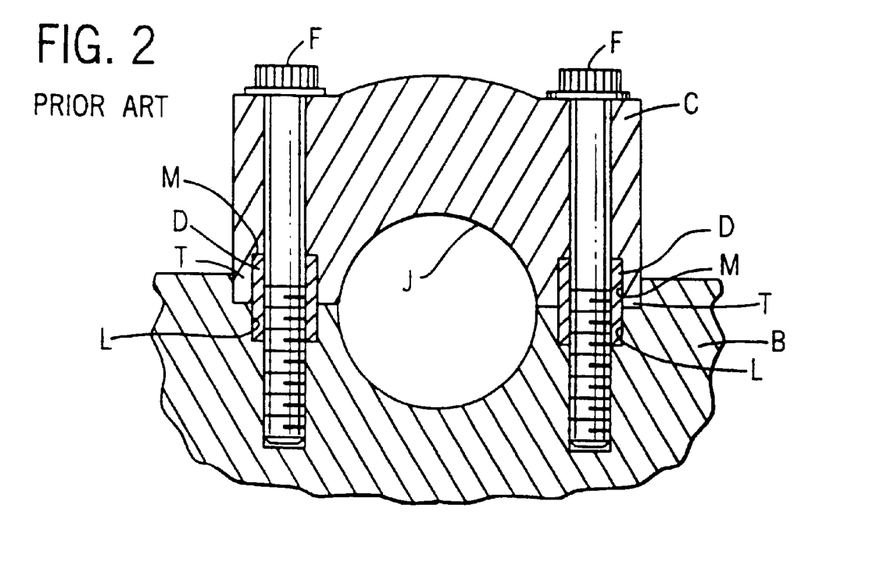
FIG. 2 is a cross-sectional view of another prior art main bearing cap secured to an engine bulkhead.

Another known method of location and attachment is shown in FIG. 2. This involves the use of hollow dowels D. These dowels D are pressed into counter-bored holes L in the engine block bulkhead P. The dowels D then locate in precisely machined counterbores M in the corresponding main bearing cap foot sections T. The accuracy of installation of the hollow dowels D is dependent upon the precision counterboring of the engine block and the main bearing cap. Both of these operations have a finite tolerance which, when stacked up with the tolerance on the dowel D outer diameter, can produce an unacceptable variation in location of the main bearing cap C. Additionally, this procedure has the added expense of purchasing precision hollow dowels, their handling and installation, and the costly machining of precision bores L in the bulkhead B and M in the main bearing caps C.

In many cases where hollow dowels as shown in FIG. 2 are used, the engine block channel/main bearing cap snap width relocation method of FIG. 1 is also used. This combination is expensive and, in fact, can produce a situation where the interference fits between the snap-width and channel are in conflict with the interference fits between the hollow dowels and the main bearing cap or bulkhead holes.

SUMMARY OF THE INVENTION

The current invention provides a new and better, but less expensive, way of precisely relocating a bearing cap relative to the bulkhead of a bearing block for reattachment after machining. A bearing cap of the invention is of the type which is bolted to a bearing support structure so as to define a bearing bore between the cap and the structure and in which bolt holes for securing the cap to the structure extend through feet of the cap and into the structure. As with prior art bearing caps, a cap of the invention has at least two feet, one on each side of the bore with one or more bolt holes extending through each foot. However, a bearing cap of the invention is sintered powder metal and has an integral boss protruding from each foot around the bolt hole. The boss fits into a counterbore formed in the bulkhead around the bolt hole and is of a shape and ductility so that the counterbore and the boss plastically conform to one another, so that when the bearing cap is removed from the bulkhead and subsequently refitted, it is precisely located relative to the bulkhead by the preformed indentations formed between the boss and counterbore when the bearing cap was first fitted to the bulkhead.

In this aspect, the boss is preferably tapered and may be provided with axial splines which either conform to the counterbore if the bulkhead is a relatively hard material such as cast iron, or bite into the bulkhead if the bulkhead is relatively soft, such as if it is an aluminum alloy. A lead-in radius may be provided on a leading edge of the boss to help initially locate the boss in the bulkhead counterbore.

Plastic conformance between the bulkhead counterbore and the boss is facilitated by the boss and remainder of the bearing cap being sintered powder metal, which is not fully dense. However, it may also need to be ductile, depending on the material of the bulkhead, and if so it is preferably a liquid phase sintering powder metal material. Such a material preferably is a powder metal alloy of iron containing phosphorus from ferrophosphorus powder with a phosphorus content of 0.4 to 0.7% and a carbon content of 0 to 0.8%. Additional strength may be achieved with the addition of copper in the amount of 0 to 4% without loss of ductility.

In another preferred aspect, a moat is formed in each foot around a trailing end of the boss. The moat creates a void into which material of the bulkhead may bulge or expand when it is deformed by the insertion of the boss.

In another aspect, the boss may be oblong in the axial direction of the bore in the bearing cap, so as to provide an interference fit with the counterbore in that direction. The snap width of the bearing cap provides an interference fit in the lateral direction, so that together the boss and snap width accurately locate the bearing cap in all directions, without the interference fit of the boss significantly interfering with the interference fit of the snap width.

In another form, depressions can be formed in the faces of the feet, so as to increase the clamping pressure for a given bolt loading at the interface between the faces of the feet and the engine block bulkhead.

Other objects and advantages of the invention will be apparent from the detailed description and drawings.

DETAILED DESCRIPTION OF THE PREFERRED EMBODIMENTS

Figure 3:
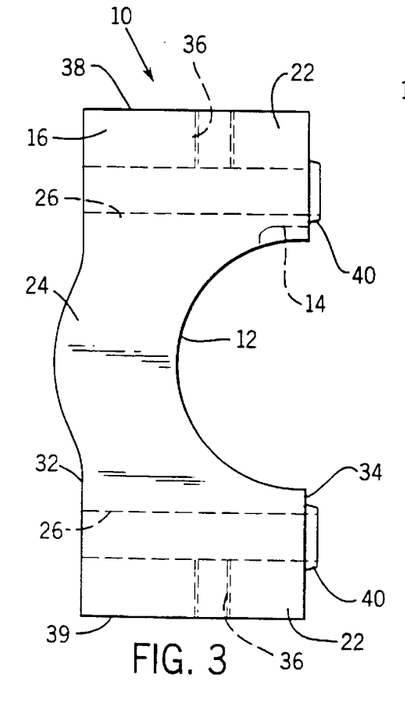
FIG. 3 is a side elevation view of a main bearing cap incorporating the invention.
Figure 4:
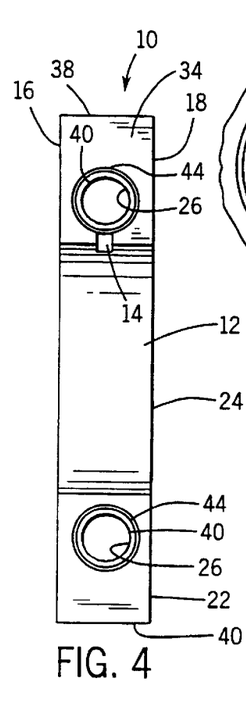
FIG. 4 is a bottom plan view of the main bearing cap of FIG. 3.

FIGS. 3 and 4 illustrate a main bearing cap 10 of the invention. The cap 10 defines a semicircular bore 12 which together with the semicircular bore of the engine bulkhead (see, for example, FIG. 2) defines the bore J (FIG. 2) through which the crankshaft of the engine extends and is journaled. Journal bearings may be received in the bore between the surface of the crankshaft and the surface of the bore J, as is well known. Cap 10 may be notched as at 14 to receive an ear of the journal bearings so as to prevent the journal bearings from rotating relative to the cap 10 and bulkhead B. The semicircular bore 12 extends through the bearing cap 10 from the front side 16 to the rear side 18.

The bore 12 defines on each of its lateral sides a foot portion 22 of the cap 10. A bridge portion 24 joins the two foot portions 22. A bolt hole 26 extends through each foot portion 22 from the top side 32 to the bottom 34 of the cap 10. The cap 10 may also be provided with threaded set screw holes 36 extending from the lateral sides 38 and 39 at right angles into the respective bolt holes 26 so as to lock the retaining bolts (F in FIG. 2) in position after the cap 10 is bolted to the engine bulkhead (B in FIG. 2) support structure.

Figure 5:
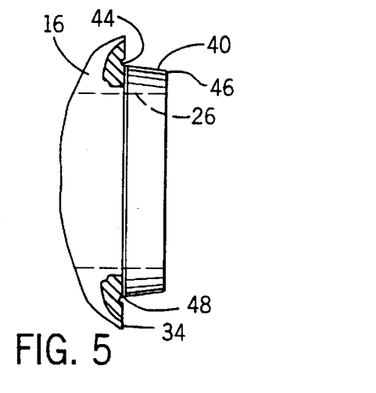
FIG. 5 is a fragmentary detail side elevation view of a foot of the main bearing cap of FIGS. 3 and 4.
Figure 6:
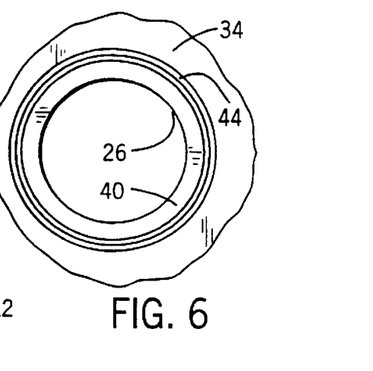
FIG. 6 is a fragmentary bottom plan view of the foot of FIG. 5.

Projecting from the bottom side 34 of each foot 22 around the respective bolt hole 26 is a boss 40. Each bolt hole 26 extends through its corresponding boss 40. FIGS. 5 and 6 show in detail the structure of the boss 40. The two bosses 40 are identical, so only one will be described in detail.

The boss 40 extends for 360° around the bolt hole 26 and is itself surrounded by a recess or moat 44 which is formed in the bottom surface 34 of the foot 22 for the purpose described below.

The bolt hole 26 extends into the engine bulkhead B where it is threaded so that bolts F, as shown in FIG. 2, may be used to secure the cap 10 to the bulkhead B. The bulkhead bolt holes are also counterbored, as shown at L in FIG. 2, so as to receive the bosses 40 in the counterbores of the bulkhead. However, the counterbores L of the bulkhead need not be as precise in diameter or position as was necessary when using the precision hollow dowels D as shown in FIG. 2, because the boss 40 is tapered and the boss 40 and counterbore L are conformable to one another.

To effect perfect mating of the parts during line boring and subsequently thereafter when the crankshaft is installed, the main bearing cap 10 is made by sintered powder metallurgy, with the bosses 40 molded integrally with the feet 22 and remainder of the bearing cap 10. As shown in FIGS. 5 and 6, the boss 40 tapers from a minor diameter at its leading edge 46 to a larger, major diameter at its trailing edge 48. The minor diameter is chosen to be less than the diameter of the counterbore L in the bulkhead B, and the major diameter is chosen to be equal to or slightly greater than the diameter of the counterbore L. This tapering of the boss 40 ensures that the main bearing cap 10 is in the identical position after crankshaft installation as it was when it was line bored. The angle of the taper is preferably greater than 70 so as to ensure easy removal of the bearing cap 10 from the bulkhead after line boring.

Figure 7:
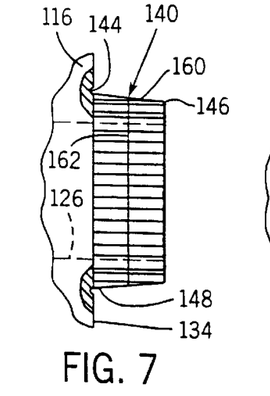
FIG. 7 is a view similar to FIG. 5 but of an alternate embodiment.
Figure 8:
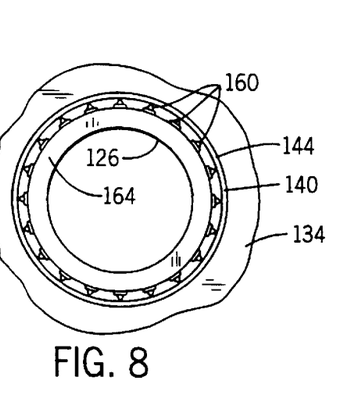
FIG. 8 is a bottom plan view of the foot of FIG. 7.
Figure 9:
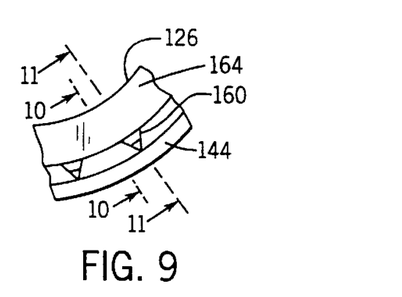
FIG. 9 is an enlarged fragmentary detail bottom plan view of the foot of FIG. 8.

An alternate embodiment of the boss 40, designated 140, is shown in FIGS. 7 and 8, with details shown in FIGS. 9–13. The boss 140 is identical to the boss 40, except as shown and described below. The boss 140 shown in FIGS. 7 and 8 has linear splines 160 angularly spaced apart all the way around its circumference. Leading edge 146 of the boss 140 defines the minor diameter of the boss 140, which is less than the diameter of the counterbore in the bulkhead into which the boss 140 fits, and the boss 140 tapers to its major diameter at its trailing edge 148, which is somewhat greater than the counterbore diameter into which the boss fits.

As shown in FIGS. 9–13, the linear splines 160 are flat from leading edge 146 to line 162, which is at approximately the axial midpoint of the boss 140, and are pointed and continue to taper outwardly at a more shallow angle from the midpoint 162 to the trailing edge 148. The underlying tubular body 164 of the boss 140 may also taper from leading edge 146 to midpoint 162 and may at that point become constant in diameter to the trailing edge 148 so as to provide adequate support to the splines 160.

FIGS. 14–19 show other alternate embodiments of the invention. Elements corresponding to elements of the boss 140 are labeled with the same reference numeral plus 100 for FIGS. 14 and 15, plus 200 for FIGS. 16 and 17 and plus 300 for FIGS. 18 and 19.

Figure 14:
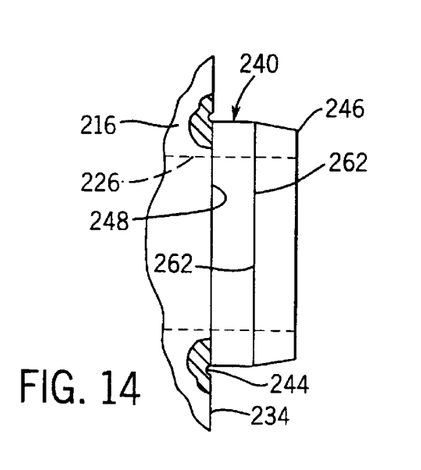
FIG. 14 is a view similar to FIG. 5 but of another alternate embodiment of a foot for a bearing cap of the invention.
Figure 15:
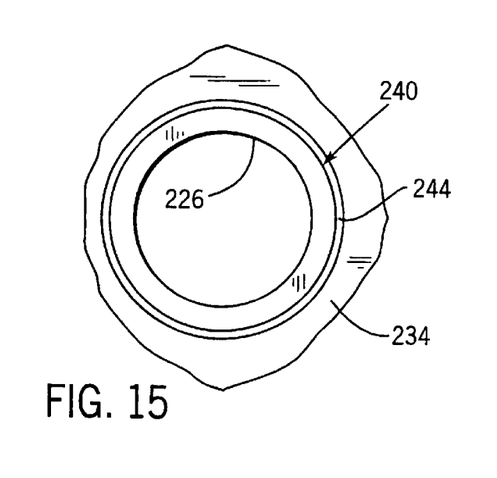
FIG. 15 is a bottom plan view of the foot of FIG. 14.
Figure 16:
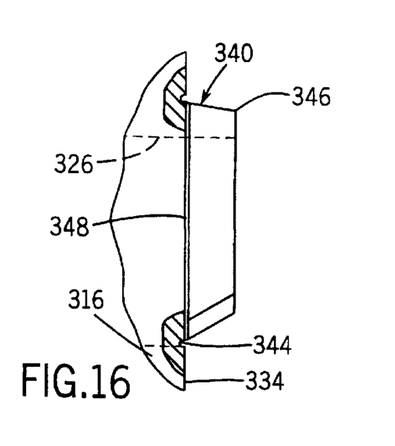
FIG. 16 is a view similar to FIG. 5 but of another alternate embodiment of a foot for a bearing cap of the invention.
Figure 17:
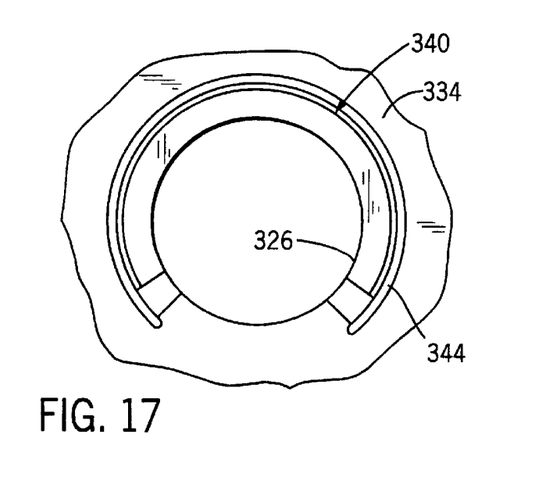
FIG. 17 is a bottom plan view of the foot of FIG. 16.

The boss 240 shown in FIGS. 14 and 15 is identical to the boss 140, except that it is not provided with axially running linear splines 160. The boss 340 shown in FIGS. 16 and 17 is identical to the boss 40 of FIGS. 3–6, except that it does not extend for 360° around the bolt hole 26. The moat 344 is also coterminous with the trailing edge 348 of the boss 340. The boss 440 is the same as the boss 40, except that it is provided with ribs or axially running linear splines 460 which are flat from their leading edges to their trailing edges.

The exact design of the boss used for practicing the invention will depend upon the application. There must be sufficient conformance between the bosses 40 and the counterbores L of the supporting structure so as to precisely locate the bearing cap 10 relative to the support structure. If additional conformance is needed, a design utilizing the linear splines such as 160 or 460 may be used. The combination of these linear splines and the fact that the sintered powder metal is not fully dense, results in the needed conformance between the boss and the corresponding bulkhead counterbore.

Where the bulkhead material is an aluminum alloy, for example, the linear splines bite into the softer counterbore to make a perfect fit. Any bulging of the aluminum is accommodated by the moat 44, 144, 244, 344, or 444. In the case of a cast iron bulkhead, which is relatively hard and nonconforming, the splines can condense and conform to the cast iron counterbore, and, again, form a perfect fit.

FIGS. 20–23 illustrate another alternate embodiment of a bearing cap of the invention. Elements corresponding to elements of the boss 140 are labeled with the same reference numeral plus 400.

The boss 540 is the same as the boss 140, except that it is oblong (which includes oval), having its longer dimension in the direction of the crankshaft which is retained by the bearing cap, i.e., in the axial direction of the bore 412. The result is that the bosses 540 engage their round engine block bulkhead counterbores in such a way as to prevent relative motion in the axial direction but provide a clearance in the lateral direction, which is the direction that the snap width (between surfaces 438 and 439) provides for location. Thereby, by the oblong bosses 540 providing an interference fit in the axial direction and the snap width providing an interference fit in the lateral direction, the bearing cap 410 is accurately located in all directions.

Since the boss 540 is oblong, the recess or moat 544, which has a round outer periphery, varies in width as illustrated. The hole 526 is a truncated round shape, having its round shape truncated by laterally extending flats which are spaced far enough apart in the axial direction to permit passage of the bolt F for securing the cap 510. This shape allows substantial clearance with the In FIGS. 20 and 21, a 360° boss 540 is shown on the left side and a boss 540 is shown on the right which extends for less than 360°, extending for approximately 270° with its inwardmost quadrant absent. The moat 544 of the right boss 540 is also truncated. It should be understood that the bosses can be different as shown, or can be the same, with both being 360° or 270° bosses.

The precise installation of the main bearing cap 10, 110, 210, 310, 410 or 510 with any of the bosses described above can be achieved by tightening the retaining bolts F alone, or alternatively, by applying independent pressure to the assembly, for example, from a hydraulic ram. After line boring, the bearing cap is readily removed due to the tapered geometry of the installation interface. After installing the crankshaft, the bearing caps are replaced, and the integral bosses nest into their preformed positions (preformed when the cap was initially mounted to the support structure prior to line boring) with great accuracy.

Figure 10:
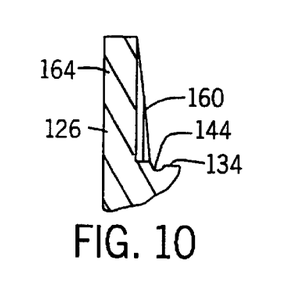
FIG. 10 is a partial cross-sectional view as viewed from the plane of the line 10—10 of FIG. 9.
Figure 11:
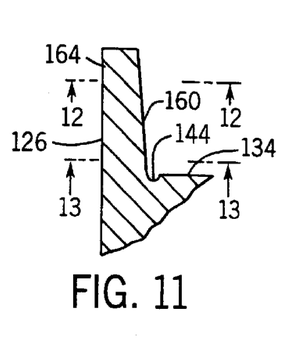
FIG. 11 is a partial cross-sectional view as viewed from the plane of the line 11—11 of FIG. 9.
Figure 12:
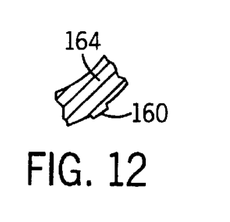
FIG. 12 is a partial cross-sectional view as viewed from the plane of the line 12—12 of FIG. 11.
Figure 13:
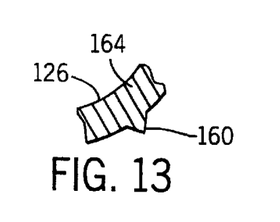
FIG. 13 is a partial cross-sectional view as viewed from the plane of the line 13—13 of FIG. 11.
Figure 18:
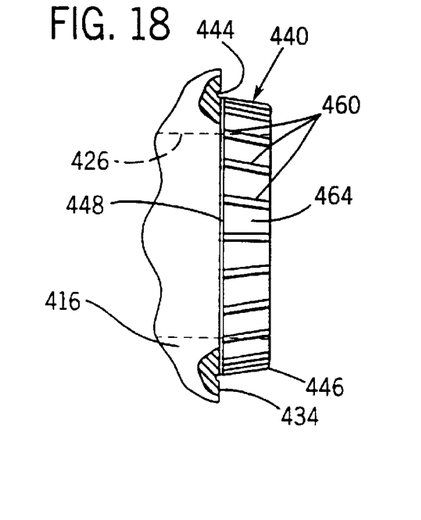
FIG. 18 is a view similar to FIG. 5 but of another alternate embodiment of a foot for a bearing cap of the invention.
Figure 19:
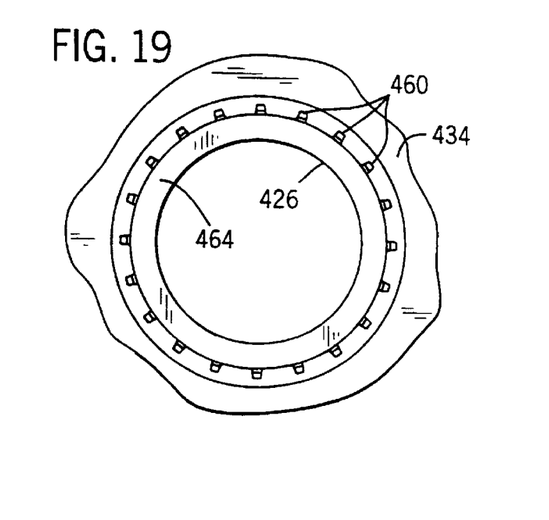
FIG. 19 is a bottom plan view of the foot of FIG. 18.
Figure 20:
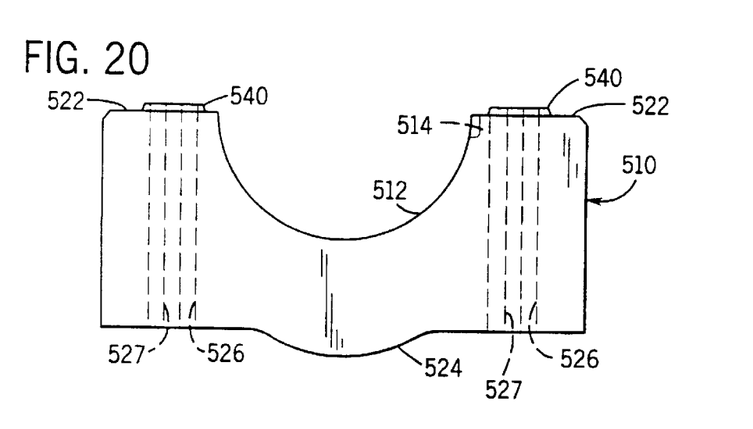
FIG. 20 is a side elevation view of another alternate embodiment of a bearing cap of the invention, similar to FIG. 3.
Figure 21:
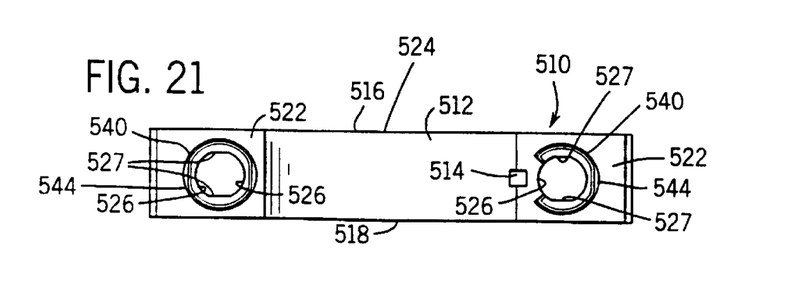
FIG. 21 is a bottom plan view of the bearing cap of FIG. 20.
Figure 22:
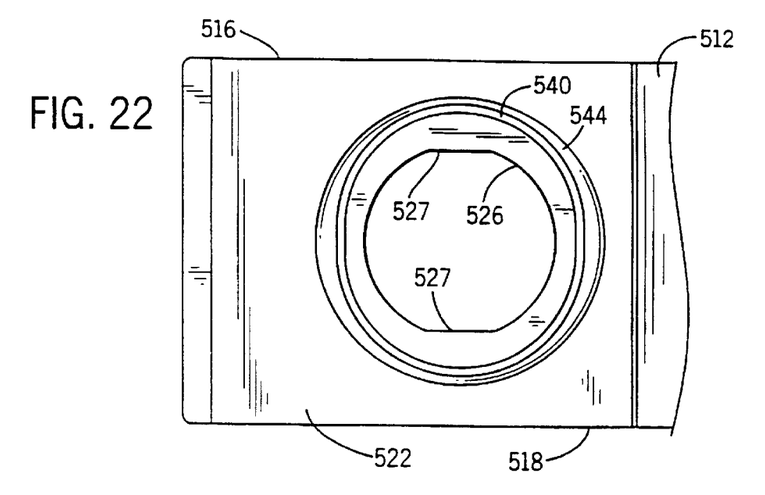
FIG. 22 is a detail bottom plan view of the left foot shown in FIGS. 20 and 21.
Figure 23:
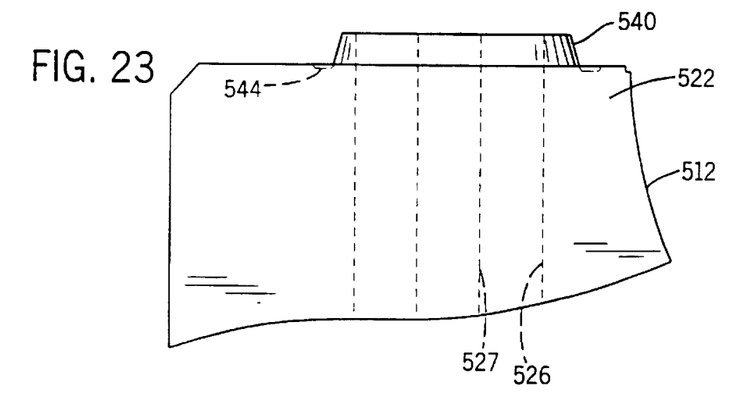
FIG. 23 is a detail side elevation view of the foot shown in FIG. 22.

As stated above, the particular design of the boss will depend on the application. The principal variables in the design are the taper angle, the length of the boss, the relative lengths of the tapered and straight portions of the boss, the number, width, and radial height of any vertical splines, and the radial wall thickness of the boss. The leading edge of the splines may be tapered at a higher angle as shown in FIG. 10 or may have a small lead-in radius as shown in FIG. 18 to aid in initial location of the bearing cap bosses into the bulkhead counterbores. The particular design of a bearing cap incorporating the invention will depend upon various specific design details of the bulkhead, such as whether a bearing notch is needed in the cap, wall thicknesses needed between the bolt hole and the side of the bearing cap, the material of the bulkhead, and the design of the bulkhead counterbore hole, for example, with respect to lead-in chamfers or even a preformed taper. In all cases, however, it is essential that the sintered powder metal bearing cap boss produce a mating surface to ensure identical relocation after installation of the crankshaft, by plastically conforming to the counterbore, causing the counterbore to plastically conform to the boss, or a combination of both.

As mentioned above, for practicing the invention, the bearing cap must be made of sintered powder metal. A desirable quality of the powder metal material of the bearing cap for carrying out the invention is ductility. Since the splines, or the body in some cases, will yield plastically to some extent during the initial installation process, it is important to avoid cracking. Most powder metal ferrous materials are inherently brittle. To overcome this potential difficulty, it is preferable to use a material that has an adequate ductility.

There are a number of ways of improving the ductility of sintered powder metal ferrous materials, but most of them are expensive or inapplicable to bearing caps. However, an appropriate liquid phase sintering system is particularly useful in providing the necessary ductility in this application. An example of this process involves the use of a phosphorus compound such as ferrophosphorus. A small amount of ferrophosphorus powder is added to the ferrous material powder during powder blending. After compaction and during the thermal treatment stage (sintering), this small amount of ferrophosphorus becomes molten and dramatically increases the rate of atomic diffusion during the sintering process. This enhanced diffusion produces a rounding of the microporosity in the sintered powder metal component which, in turn, provides increased ductility.

To achieve this, the composition of the powder metal material from which the bearing cap of the invention is made should contain 0.4 to 0.7% phosphorus (preferably 0.4 to 0.6% phosphorus), a carbon content of 0 to 0.8% carbon (preferably 0.4 to 0.6% carbon) and with the balance being essentially iron (neglecting impurities). This material with the preferred percentages can produce a tensile elongation of 3%, which is adequate for straight spline conformance to a cast iron counterbore, and also strong enough to indent a cast aluminum alloy bulkhead. Additional strength can be attained by the addition of 0 to 4% copper in the final mix of the material for making bearing caps of the invention without loss of ductility.

In practicing the invention, it is important to ensure dimensional consistency of the distance between the axial centers of the bosses. It is relatively inexpensive to control the counterbore L diameter hole centers in the engine block bulkhead by the use of appropriate drill guides or computer controlled drillheads. However, to control the distance between the boss centers of bearing caps of the invention requires some form of dimensional control during or after the sintering operation. One example of an appropriate procedure is to repress the bearing cap in a set of tools which will straighten and adjust the dimensions of the component. This is a procedure well known in the powder metallurgy industry as repressing (also known as sizing or coining). An alternative approach is to use a fixture which locates and retains the bearing cap holes in position during sintering. Such a fixture could be made from either stainless steel or molybdenum and may consist of a U-shaped staple like structure, the legs of which are inserted into the bolt holes of the main bearing cap, thereby avoiding distortion during the sintering operation.

A common problem encountered in main bearing cap joints is "fretting". This is the relative micromovement of the clamped contact surfaces of the bearing cap and bulkhead at high frequency that results in damage to the surfaces. Fretting fatigue is a possible outcome of this mechanism.

Figure 24:
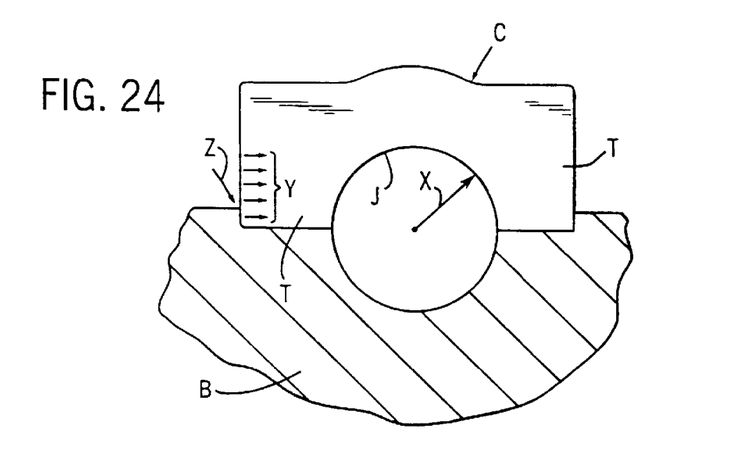
FIG. 24 is a view of how a bearing cap can be loaded in operation.

When a main bearing cap is constrained laterally in the block by a snap width channel as shown in FIG. 1, it can still move fore and aft (axially) and also from side to side (laterally) under load. Fore and aft motion is due to crankshaft bending (especially in V- engines) which causes a rocking motion. Since there is no restraint in this direction other than bolt clamp pressure, microsliding, and therefore fretting, can occur. Similarly, as illustrated in FIG. 24, when the crankshaft loading X is pushing the cap to the "right", the left foot is pulled away from the snap channel as indicated by arrows Y to create a clearance at the area indicated by the arrow Z.

The present invention, which provides an integral hollow dowel on the bearing cap foot, improves this situation since the dowel serves to fix the position of the foot relative to the block. The fretting problem can be further mitigated by hollowing out the footprint of the bearing cap, which has the effect of raising the clamping pressure for a given bolt loading. By appropriate geometry, the remaining metal forms a land that increases the quality of clamping close to the bearing shell.

Figure 25:
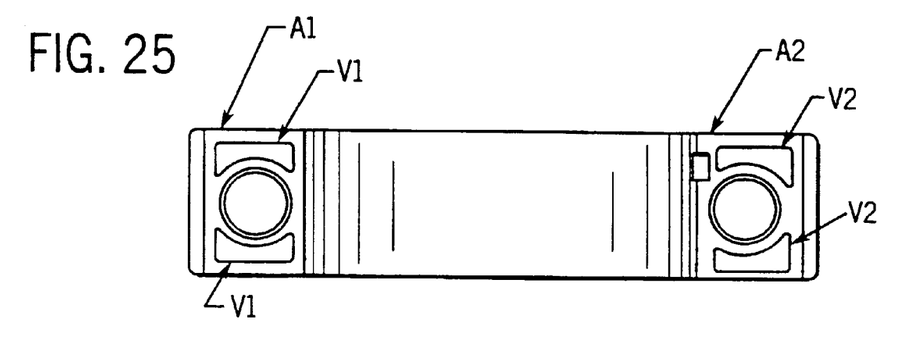
FIG. 25 is a bottom plan view of another alternate embodiment of a bearing cap of the invention.
Figure 26:
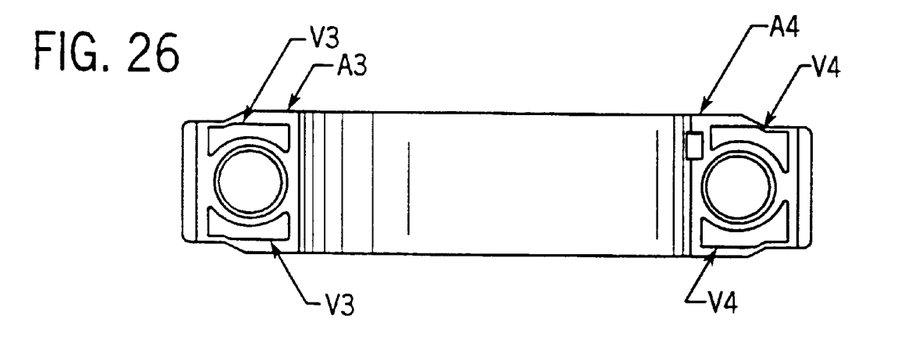
FIG. 26 is a bottom plan view of another alternate embodiment of the invention.

The technique of reducing area to raise clamping pressure is not new. However, it is very costly to achieve in volume production. The current predominant process of making bearing caps is by casting and machining. To machine precision hollow forms in a casting is prohibitively expensive. Using powder metallurgy, however, hollows can be molded into the foot with great precision for no extra cost beyond the initial tooling face form costs. Examples of four suitable forms for producing the indicated void areas V1–V4 (approximately 0.010–0.020 inches deep) and corresponding planar contact areas A1–A4 are shown in FIGS. 25 and 26. These voids may be used either with or without integral bosses as described above and may be used in any combination. Experimentation with pressure sensitive paper and finite element analysis simulation shows that the hollowed out foot surface raises the clamping pressure by the following percentages (the void area given is for each void and there are two voids per foot as illustrated):

| Contact Area (in$^2$) | Void Area (in$^2$) | Clamping Load Increase |
| --- | --- | --- |
| A1 = 1.0957 | V1 = .2942 | 32% |
| A2 = 1.1373 | V2 = .2936 | 33% |
| A3 = 1.0191 | V3 = .2936 | 30% |
| A4 = 1.0504 | V4 = .3159 | 33% |

Many modifications and variations to the preferred embodiment as described will be apparent to those skilled in the art. Therefore, the invention should not be limited to the embodiments described but should be defined by the claims which follow.

We claim:

1. In a bearing cap of the type which is bolted to a bearing support structure so as to define a bearing bore between said cap and said structure and in which bolt holes for securing said cap to said structure extend through feet of said cap and into said structure, said cap having at least two of said feet, one said foot on each side of said bore with at least one bolt hole extending through each said foot, the improvement wherein:

said cap is sintered powder metal and has an integral boss protruding from said foot around said bolt hole.

2. The improvement of claim 1, wherein said boss is tapered.

3. The improvement of claim 1, wherein axial splines are provided on the outside of said boss.

4. The improvement of claim 1, wherein a lead-in radius is provided on a leading edge of said boss.

5. The improvement of claim 1, wherein said bearing cap is made of a liquid phase sintering powder metal material.

6. The improvement of claim 5, wherein said material is a powder metal alloy of iron containing phosphorus from ferrophosphorus powder.

7. The improvement of claim 6, wherein said material has a phosphorus content of 0.4 to 0.7% and a carbon content of 0 to 0.8%.

8. The improvement of claim 7, wherein said material has a copper content of 0 to 4%.

9. The improvement of claim 1, wherein a moat is formed in each said foot around a trailing end of said boss.

10. The improvement of claim 1, wherein said boss is oblong with a major axis in an axial direction relative to said bearing bore.

11. The improvement of claim 1, wherein each said foot has a planar surface which abuts a planar surface of said bearing support structure, and wherein a void is formed in said planar surface.

12. In a bearing block of the type in which a bearing cap is bolted to a bearing support structure so as to define a bearing bore between said cap and said structure and in which bolt holes for securing said cap to said structure extend through feet of said cap and into said structure, said cap having at least two of said feet, one said foot on each side of said bore with a bolt hole extending through each said foot, the improvement wherein:

said cap is sintered powder metal and has an integral boss protruding from said foot around said bolt hole;

said support structure has a counterbore around said bolt hole for receiving said boss; and said boss and said support structure plastically conform to one another when said boss is seated in said counterbore.

\* \* \* \* \*